March 9, 1926.                                                                                      1,575,722
C. SKLAREK
ADJUSTABLE SUPPORTING MEANS FOR LIGHTS
Filed Feb. 16, 1921

INVENTOR.
Clifford Sklarek
BY Geo. F. Haight
His ATTORNEY.

Patented Mar. 9, 1926.

1,575,722

UNITED STATES PATENT OFFICE.

CLIFFORD SKLAREK, OF CHICAGO, ILLINOIS, ASSIGNOR TO INTERNATIONAL SPOTLIGHT CORPORATION, OF CHICAGO, ILLINOIS, A CORPORATION OF ILLINOIS.

ADJUSTABLE SUPPORTING MEANS FOR LIGHTS.

Application filed February 16, 1921. Serial No. 445,310.

*To all whom it may concern:*

Be it known that I, CLIFFORD SKLAREK, a citizen of the United States, residing at Chicago, in the county of Cook and State of Illinois, have invented a certain new and useful Improvement in Adjustable Supporting Means for Lights, of which the following is a full, clear, concise, and exact description, reference being had to the accompanying drawings, forming a part of this specification.

This invention relates to improvements in adjustable supporting means for lights.

As is well known, it is customary for many automobiles and trucks to be equipped with an adjustable spot light in order to properly light the road in front of the machine especially when traveling over country roads. The general practice is to mount such spot lights in front of the usual windshield. Because of the necessity of turning the spot light off and on frequently, a switch is included in the electrical lighting circuit, said switch being mounted on the usual instrument board.

The object of my invention, broadly, is to provide a spot light mounting suitable for automobiles, trucks and other vehicles employing a windshield which will be free from the objections and disadvantages of former devices and more particularly to provide a spot light mounting wherein the spot light is disposed in front of or forward of the windshield as customary and yet which may be readily adjusted to any desired position by a simple manipulation of parts disposed inside of the windshield at a point convenient to the driver.

Another object of my invention is to provide a spot light mounting of the character above indicated wherein the electric lighting wires are entirely concealed and weather protected within the spot light mounting itself and so arranged that the switch for turning off and on the lamp is readily accessible to and operable by the same hand of the driver which is employed in adjusting the position of the spot light itself.

One of the specific objects of the invention is to provide a support or mounting for a spot light of the character above indicated which support or mounting is readily adjustable, when applied, to windshield structures of different slope, so that my improvement may be employed without modification, as readily with one style of car as another.

Other objects of the invention will more clearly appear from the description and claims hereinafter following.

Figure 1:
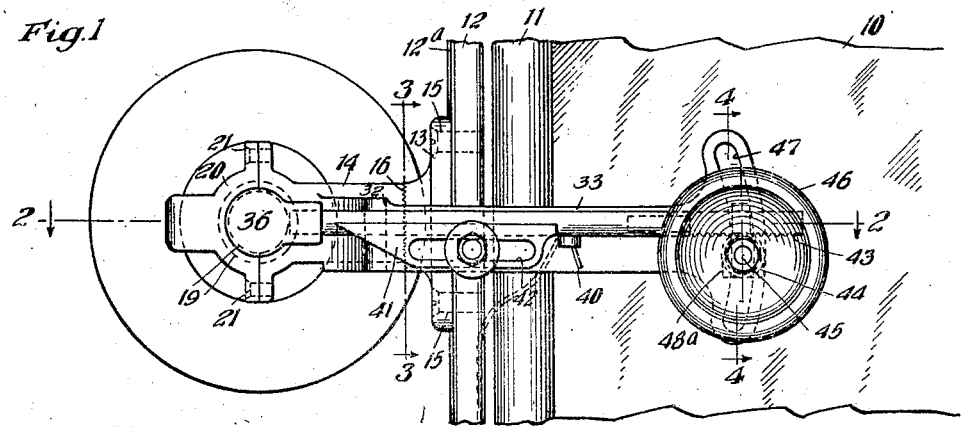
Figure 2:
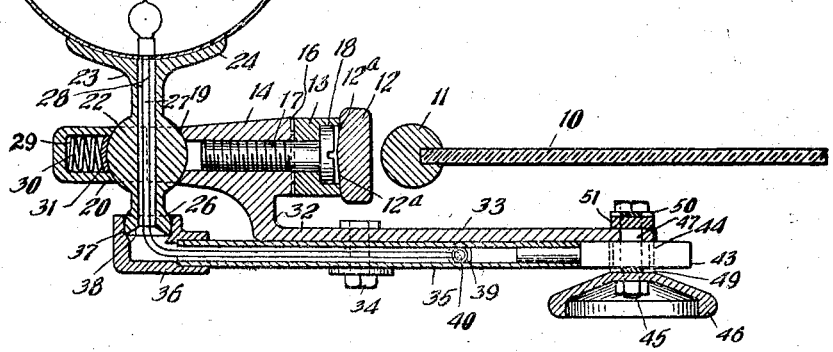
Figure 3:
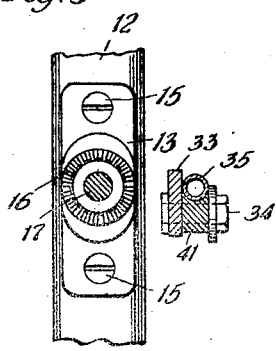
Figure 4:
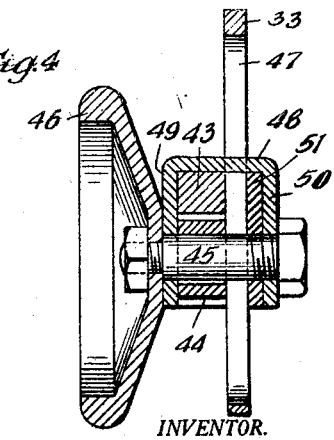

In the drawing forming a part of this specification, Figure 1 is an elevational view looking from the driver's seat of an automobile toward the windshield, showing my improvements as applied to the windshield structure of an automobile. Only portions of the windshield structure are shown in order to accommodate the view on the sheet. Figure 2 is a horizontal, sectional view corresponding substantially to the line 2—2 of Figure 1. Figure 3 is a sectional view corresponding substantially to the line 3—3 of Figure 1. And Figure 4 is an enlarged detail sectional view corresponding substantially to the broken section line 4—4 of Figure 1.

In said drawing, 10 denotes a portion of one of the usual glass windows employed in a windshield of an automobile, the same being mounted in a suitable sash, a portion of which is shown at 11. As is well known, the windows themselves are generally adjustably mounted in a suitable windshield framework, one side post of which is indicated at 12. The most common practice is to make the section of such side frame members 12 as best indicated in Figure 2 where it will be noted that the outer side thereof is oppositely beveled as indicated at $12^a$—$12^a$.

In carrying out my invention, I employ a support proper for the spot light or lamp, said support comprising two parts, a base member 13 and a supplemental part 14. The base member 13 is vertically elongated as best shown in Figures 1 and 3 and is adapted to be permanently and rigidly attached to the side post 12 in any suitable manner as by the screws 15—15, the base member 13 extending parallel to the side post 12 as shown in Figure 3. In order that the base member may secure a solid bearing on the side post 12, it is preferably slightly undercut on its inner side so as to conform to the double beveled surfaces $12^a$—$12^a$ and thereby insure contact between the base member 13 and the side post 12 at the sides of the base member as shown in Figure 2.

In some types of automobiles, the windshield extends vertically whereas in others, the windshield is sloped upwardly and toward the rear of the automobile. In order to adapt my improvement to any slope of windshield, I employ an adjustable connection between the base member 13 and the outstanding member 14. This adjustable connection is in the form of complemental circularly arranged series of radial teeth or notches 16 as best shown in Figure 3 and a machine screw 17 which has the head thereof countersunk in a recess 18 in the base member 13. With this construction it is evident that the member 14 may be adjusted angularly about a horizontal axis to any desired degree with respect to the base member 13 and, by tightening up the screw 17, securely locked in said adjusted position. This will be done prior to applying the base member 13 to the side post 12 and after it is in position, it is evident that the screw 17 is entirely concealed and also protected from the weather.

The member 14, at its outer end, is provided with a half ball socket as indicated at 19, the other half being provided in a section 20 arranged to be bolted or screwed thereto as by the machine screws 21—21. Universally adjustably mounted within the ball socket above described is an enlarged ball section 22 formed on the elongated lamp bracket proper 23. The latter at its forward side is provided with any suitable flange 24 to which the lamp 25 may be secured. On its rear end, the bracket 23 is provided with another partial ball enlargement 26 of lesser diameter than the ball 22. The bracket 23 has a central passage 27 adapted to accommodate the electric lighting wires 28 as shown in Figure 2. Within the section 20 is formed a horizontally extending recess 29 containing a spring 30 and fiber friction pad 31, the latter being conformed to the periphery of the ball 22 and adapted to frictionally engage the latter to assist in holding the lamp in any adjusted position.

The part 14 of the supporting means is provided with a rearwardly extended arm 32, the latter being then extended horizontally as indicated at 33 back of the side post 12 and window pane 10, the inner end of said arm 33 being terminated at a position where it is readily accessible and convenient to the driver without the necessity of the driver arising from the seat in setting the spot light.

Intermediate the ends of the arm 33, a fulcrum or pivot pin is provided as indicated at 34, the same preferably being in the form of a bolt with suitable washer and nut. Pivotally and longitudinally adjustably mounted on said pivot pin or fulcrum 34 is an operating arm or rod 35, the same being shown as of tubular form and having secured thereto at its outer or lefthand end a hollow bushing 36, the latter having a partial ball socket 37 formed therein cooperable with the ball 26 of the lamp bracket. The entrance to said socket 37 is cylindrical or enlarged so as to prevent binding between the bushing 36 and the ball 26 when the latter is adjusted as hereinafter explained. The passage 27 is flared as indicated at 38 so as to prevent binding or chafing of the wires as the relative positions of the parts are changed. Said wires are extended thru the tubular operating arm 35 and leave the latter thru an opening as indicated at 39 where a switch of suitable form may be introduced into the lighting circuit as indicated at 40, the wires then being preferably carried down alongside the side post 12 and connected to the battery as will be understood. The operating arm 35 is pivotally mounted on the fulcrum 34 preferably by means of a plate 41 soldered or sweated to the tube 35, said plate 41 having an elongated slot 42 therein thru which the fulcrum pin extends.

At its inner end, the operating arm 35 is provided with a horizontally extending rack 43 with which is adapted to cooperate a pinion 44 secured to a bolt 45, the latter having also secured thereto a manually operable hand wheel 46. The bolt 45 extends thru an arcuate slot 47 formed on the stationary support 33, said slot 47 being concentric with the pivot or fulcrum pin 34. Said bolt also carries a substantially U-shaped plate clip 48 having an outer arm 49 and an inner arm 50, said plate straddling the pinion 44, rack 43 and also a friction disc 51 on the opposite side of the stationary support 33 to that of the rack and pinion. The clip 48 is of reduced width where it passes thru the slot 47 as best indicated in Figure 1, and at its lower ends is enlarged as indicated at 48ª in Figure 1 to suitably overlap the edges of the supporting arm 33. With this construction, I obtain a slidable but frictional grip between the adjusting means and the stationary support 33 so that the operating arm 35 may be oscillated or adjusted in a vertical plane about the fulcrum pin 34 and held in any such adjusted position. As will be evident, rotation of the hand wheel 46 will effect either inward or outward movement of the operating arm 35 which of course is permitted on account of the slot 42.

From the preceding description, it will be seen that, by means of the pivotal movement in a vertical plane of the operating arm 35 and its inward and outward horizontal movements, I thereby am enabled to produce a universal adjustment of the lamp bracket proper 23 on its ball and socket joint and furthermore that the lamp or spot light will be held in any adjusted position. It will also be evident that the control switch 40 can easily be operated by the thumb or a finger of the same hand employed in shifting the position of the spot light. The parts are all of simple and relatively inexpensive construction; the total weight is small; and the entire arrangement compact and easy to operate without requiring the exertion of any appreciable strength.

I have herein shown and described what I now consider the preferred manner of carrying out the invention, but the same is merely illustrative and I contemplate all changes and modifications that come within the scope of the claims appended hereto.

I claim:

1. In a spot light mounting for vehicles having a windshield, the combination with a support adapted to be secured to part of the windshield structure of the vehicle; of a bracket having a lamp mounted adjacent one end thereof; a universal connection between an intermediate portion of said bracket and said support; and an operating member connected to the other end of said bracket, said member being extended inwardly of the windshield and pivotally and slidably mounted on said support; and means by which said member may be manually adjusted to impart universal movements to said bracket.

2. In a spot light mounting for vehicles having a windshield, the combination with a support adapted to be secured to part of the windshield structure of the vehicle; of a bracket mounted on said support and tiltable angularly in every direction, said bracket being adapted to have a lamp connected thereto; an operating member connected with said bracket, such member being operable angularly with respect to said bracket, and being adjustably mounted on said support; and means on said support for mounting said member for endwise and pivotal movement by which the same may be adjusted to impart universal movements to said bracket.

3. In a spot light mounting for automobiles, trucks, and like vehicles having a windshield, the combination with a support adapted to be secured to a fixed part of the windshield structure of the vehicle; a bracket universally adjustably mounted on said support and adapted to have a lamp secured thereto; an operating member operatively connected with said bracket, said member being pivotally and slidably mounted with respect to said support; and means, located inside of the windshield, by which adjustment of said operating member may be effected to thereby adjust the position of the lamp.

4. In a spot light mounting for automobiles, trucks, and like vehicles having a windshield, the combination with a support adapted to be secured to a part of the windshield structure of the vehicle; of a bracket, said bracket and support having a ball and socket adjustable connection; an operating member operatively connected with said bracket, said member being extended inside of the windshield; and means, located inside of the windshield and mounted on said support, for manually adjusting the position of said operating member and thereby the lamp.

5. In a spot light mounting for automobiles, trucks, and like vehicles having a windshield, the combination with a support adapted to be secured to a part of the windshield structure of the vehicle; of a bracket, said bracket and support having an adjustable ball and socket connection; an operating member, said member and bracket having also an adjustable ball and socket connection, said member being adjustably mounted on said support; and rotatable means for manually adjusting said member to thereby effect adjustment of the bracket.

6. In a spot light mounting for automobiles, trucks, and like vehicles having a windshield, the combination with a support adapted to be secured to a part of the windshield structure of the vehicle, said support including a part adapted to be rigidly secured to the windshield structure and another part detachably connected to the first named part and adjustable about a horizontal axis with respect to the latter to thereby adapt the support for use on windshields having different inclination; of a lamp-supporting bracket adjustably mounted on said support; and means mounted on said detachable part of the support and adjustable in unison therewith about said horizontal axis for effecting adjustment of said bracket with respect to the support.

7. In a spot light mounting for automobiles, trucks, and like vehicles having a windshield, the combination with a support adapted to be secured to one edge of the windshield structure of the vehicle; a bracket adjustably mounted on said support and adapted to have a lamp secured thereto and extended forwardly of the windshield; an operating member operatively connected with said bracket and extended inside of and substantially parallel to the windshield, said bracket and operating member having interior communicating passages adapted to house electric lamp wiring; and means, located on the inner side of the windshield, by which said operating member may be manually adjusted to thereby position the lamp.

8. In a spot light mounting for automobiles, trucks, and like vehicles having a windshield, the combination with a support adapted to be secured to one edge of the windshield structure of the vehicle; a bracket adjustably mounted on said support and adapted to have a lamp secured thereto and extended forwardly of the windshield; an operating member operatively connected with said bracket and extended inside of and substantially parallel to the windshield, said bracket and operating member having interior communicating passages adapted to house electric lamp wiring; means, located on the inner side of the windshield, by which said operating member may be manually adjusted to thereby position the lamp; and a switch carried by said operating member adjacent said means and on the inner side of the windshield.

9. In a spot light mounting for vehicles having a windshield, the combination with a support adapted to be secured to a side edge of the windshield structure, said support having an arm thereof extended horizontally to a point inside of the windshield; of a lamp-supporting bracket adjustably mounted on said support at a point outside of the windshield structure; and an operating member pivotally and slidably mounted on said extension of the support, said operating member having an adjustable connection with the lamp bracket and accessible for operation at a point inside of the windshield.

10. In a spot light mounting for vehicles having a windshield, the combination with a support adapted to be secured to a part of the windshield structure of the vehicle, said support having an arm extended to a point inside of the windshield; of a lamp-holding bracket universally pivotally mounted on said support; an operating member longitudinally slidably mounted on said arm, said member having operative pivotal connection with the lamp bracket; a rack rigid with said operating member; and a manually operable pinion cooperable with said rack and by which said operating member is adapted to be adjusted inwardly and outwardly with respect to said arm to thereby effect adjustment of the lamp.

11. In a spot light mounting for vehicles having a windshield, the combination with a support adapted to be secured to a part of the windshield structure of the vehicle, said support having a stationary arm extended inside of the windshield, said arm having an arcuate slot at its inner end; of a lamp-holding bracket adjustably mounted on said support; an operating member pivotally mounted on said arm to swing in a vertical plane and having operative connection with said lamp bracket; and means, carried by said operating member, extended thru said arcuate slot and including a friction clamp cooperable with said fixed arm whereby said operating member will be held in adjusted position with respect to the support.

12. In a spot light mounting for vehicles, the combination with a support adapted to be secured to a part of the vehicle, said support having an arm rigid therewith, said arm having an arcuate slot; of a lamp-holding bracket universally adjustably mounted on said support; an operating member pivotally and slidably mounted on said arm, said member having operative connection with the bracket; a rack rigid with said member at a point adjacent said slot; a manually operable pinion cooperable with said rack, said pinion being mounted on a bolt extending thru said slot; and a friction gripping device also carried by said bolt and cooperable with said fixed arm to maintain the operating member in any adjusted position.

13. In a light mounting of the character described, the combination with a support adapted to be secured to a windshield structure; of a lamp-holding bracket adjustably mounted on said support; an operating member operatively connected with said bracket and mounted on said support; and means for imparting pivotal movement to said operating member about an axis substantially perpendicular to the plane of the windshield and longitudinal movement thereto in planes substantially parallel to the windshield.

14. In a light mounting of the character described, the combination with a support adapted to be secured to a windshield structure; of a lamp-holding bracket adjustably mounted on said support; an operating member operatively connected with said bracket and mounted on said support; and means for imparting pivotal movement to said operating member about an axis substantially perpendicular to the plane of the windshield and longitudinal movement thereto in planes substantially parallel to the windshield, said means including a bodily adjustable and rotatable hand wheel.

In witness that I claim the foregoing I have hereunto subscribed my name this 5th day of Feb. 1921.

CLIFFORD SKLAREK.